United States Patent [19]

Rahman

[11] Patent Number: 4,928,093

[45] Date of Patent: May 22, 1990

[54] CURSOR CONTROL MECHANISM

[75] Inventor: Abdul W. b. A. Rahman, Singapore, Singapore

[73] Assignee: Hewlett-Packard Company, Palo Alto, Calif.

[21] Appl. No.: 309,833

[22] Filed: Feb. 10, 1989

[51] Int. Cl.$^5$ .............................................. G09G 1/00
[52] U.S. Cl. .................................... 340/709; 340/710; 74/471 XY; 338/128
[58] Field of Search ....................... 340/710, 709, 706; 74/471 XY; 178/18; 338/128

[56] References Cited

U.S. PATENT DOCUMENTS

| | | |
|---|---|---|
| 2,555,156 | 5/1951 | Schaefer et al. |
| 4,313,113 | 1/1982 | Thornburg et al. ............... 340/709 |
| 4,692,756 | 9/1987 | Clark et al. ......................... 340/709 |
| 4,712,101 | 12/1987 | Culver et al. ....................... 340/710 |
| 4,724,715 | 2/1988 | Culver et al. ....................... 74/471 R |
| 4,799,049 | 1/1989 | Avila et al. .......................... 340/709 |

FOREIGN PATENT DOCUMENTS 60-235227 11/1985 Japan .

OTHER PUBLICATIONS

Leon, "Thumbwheel Positional Control Unit", IBM Techical Disclosure Bulletin, vol. 21, No. 7, Dec. 1978, pp. 3026-3027.

Primary Examiner—Alvin Oberley
Attorney, Agent, or Firm—Roland I. Griffin; Alan H. Haggard

[57] ABSTRACT

A hand-controlled mechanism is described for producing signals to move the position of a cursor in a computer display. The mechanism includes a shaft with an elongated axis. A plurality of conductors are wrapped around the shaft and a cylindrical member is mounted for both rotary and lateral movements along the shaft. Signal drivers are provided for applying an energizing signal to a sequence of the conductors. The cylindrical member is provided with conductive plates which overlap a plurality of the conductors, the plates acting to couple an energizing signal applied to one conductor to other conductors which are overlapped by the plates. A decoder senses the coupled energizing signals and provides an output indicative of the position of the cylindrical member to accordingly control a cursor's position. In a preferred embodiment, first and second conductor groups are helically wrapped about the shaft in opposite directions and with orthogonal pitches. By comparing the outputs from conductive plates which are juxtaposed to both wrapped conductor groups, the change of position of the cylindrical member can be accurately determined for cursor control purposes.

14 Claims, 4 Drawing Sheets

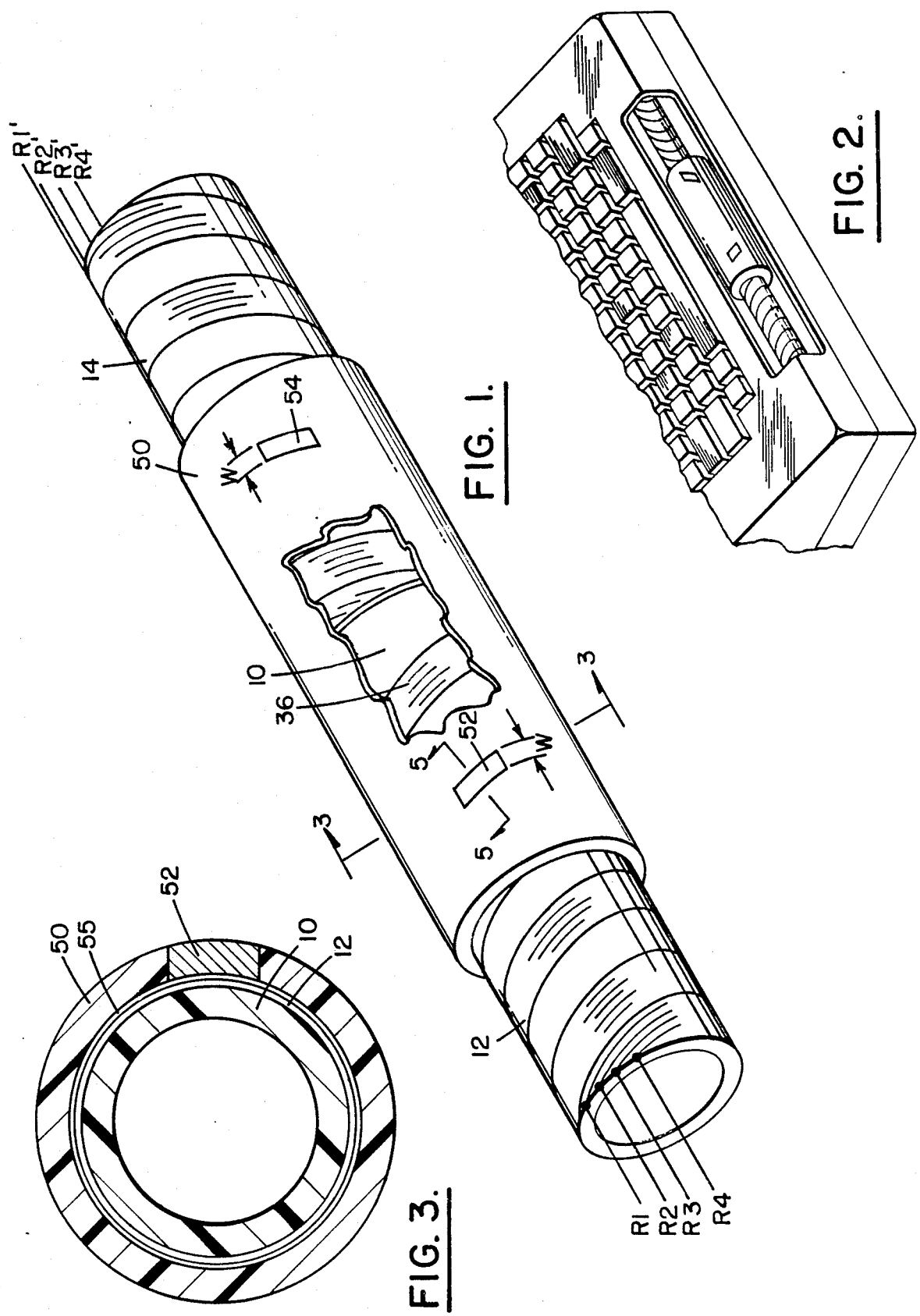

CURSOR CONTROL MECHANISM

FIELD OF THE INVENTION

This invention relates to apparatus for controlling an alpha-numeric display device and, more particularly, an apparatus for controlling the position of an indicator on the screen of a display device.

BACKGROUND OF THE INVENTION

The mouse is a commonly used input device for computer display terminals, and provides signals to control the position of a cursor on the display face. The mouse is configured as a small, box-like device and is placed on and moved over a flat surface in various directions. As position changing signals are generated by the mouse, they are transmitted to the terminal which causes a corresponding movement of the cursor. While the mouse is useful for many applications, it requires that one hand be withdrawn from the terminal's keyboard to control its movement. Recently, a new mechanism has been developed which provides directional control signals for a cursor, but allows both of the users hands to remain in contact with the keyboard. In U.S. Pat. No. 4,712,101 to C. F. Culver, this mechanism is shown as comprising a rotatable shaft on which a cylinder has been mounted. The mechanism is constructed as part of or adjacent to a keyboard and is positioned on the user side of the shift bar. In one configuration, it comprises a separate entity which sits immediately in front of the keyboard.

The cylinder rotates with the shaft as the shaft rotates; however, the cylinder is able, simultaneously, to translate longitudinally along the axis of the shaft. One encoder is coupled to the shaft and provides rotary shaft movement signals which control one direction of movement of the cursor. Another encoder is coupled to the cylinder and provides a signal indicative of its longitudinal movement. That signal is employed to control the cursor's movement in a second direction on the display. As a result of this structure, a cursor's position in the display is controlled through the action of one hand both rotating and translating the mechanism while still in contact with the keyboard.

Culver employs a variety of encoders to derive his motion signals. In one version, he employs a code wheel rotatable with the shaft and a second encoder wheel which is operated by a cable connected to the cylinder. In another version, the rotary wheel is coupled to the shaft by a gear arrangement while the longitudinal movement sensing is accomplished by a linear encoder directly coupled to the cylinder. In still another version, Culver suggests the use of a linear resistive strip for longitudinal positional sensing.

In U.S. Pat. No. 4,724,715 Culver further describes a number of design modifications to the structures shown in his '101 patent. Those modifications revolve about the use of analogue elements as position sensors rather than the digital encoders shown in his earlier patent. Despite the acknowledged benefits of Culver's input mechanism, his implementations are expensive and some are difficult to maintain in adjustment when operated by the user. Furthermore, Culver employs a number of mechanical devices to derive his position sensing outputs. To the extent that sensing and position encoding can be performed electrically, system reliability increases and product and assembly costs decrease.

Accordingly, it is an object of this invention to provide an improved cursor control mechanism.

It is another object of this invention to provide a cursor control mechanism which employs electrical sensing to determine position and movement.

It is a further object of this invention to provide an improved cursor control mechanism which is less expensive and more reliable than the prior art.

SUMMARY OF THE INVENTION

A hand-controlled mechanism is described for producing signals to move the position of a cursor in a computer display. The mechanism includes a shaft having an elongated axis. A plurality of conductor means are wrapped around the shaft and a cylindrical member is mounted for both rotary and longitudinal movement along the shaft. Drive means are provided for applying an energizing signal to a sequence of the conductor means. The cylindrical member is provided with conductive plate means which overlap a plurality of the conductor means, the plate means acting to couple an energizing signal applied to one conductor means to other conductor means which are overlapped by the plate means. Decoder means are connectable to the other conductor means for sensing the coupled/energizing signals and for providing an output indicative of the movement of the cylindrical member to accordingly control a cursor's position.

In a preferred embodiment, first and second conductor means are helically wrapped about the shaft in opposite directions. By comparing the outputs from conductive plate means which are juxtaposed to both wrapped conductor means, the change of position of the cylindrical member can be accurately determined for cursor control purposes.

DESCRIPTION OF THE DRAWINGS

FIG. 1 is a partial perspective view of the invention.

FIG. 2 is a partial perspective view of the invention when in place in a keyboard.

FIG. 3 is a section of the mechanism of FIG. 1 taken along line 3—3 of FIG. 1.

DETAILED DESCRIPTION OF THE INVENTION

Figure 4:
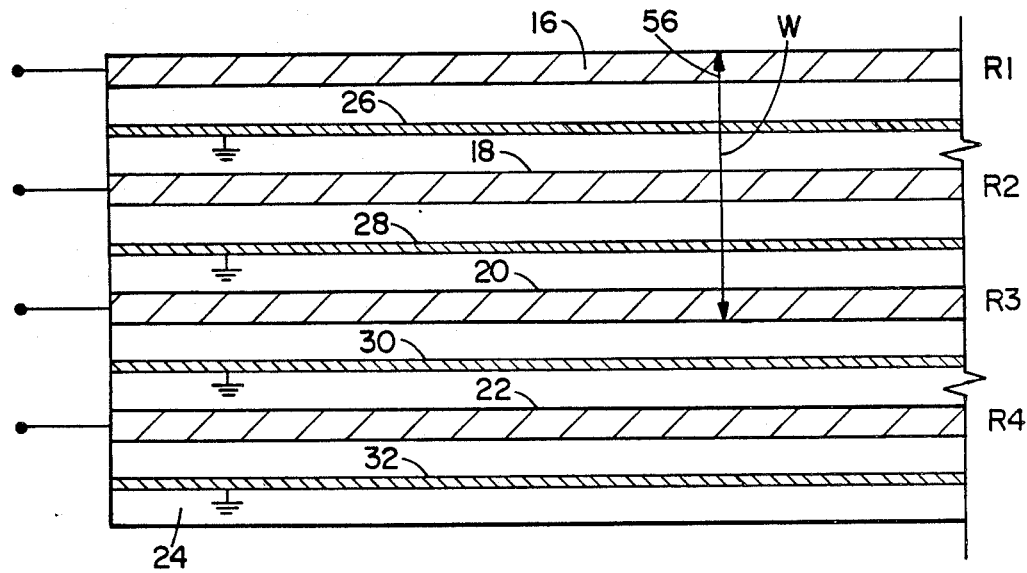
FIG. 4 is a plan view of the flexible conductor sheet utilized with the invention.

Referring now to FIG. 1, the cursor control mechanism comprises a cylindrical shaft 10 about which are helically wound two separate flexible conductor sheets 12 and 14. A detailed plan view of each of conductor sheets 12 and 14 is shown in FIG. 4 and each comprises a plurality of flexible row conductors 16, 18, 20 and 22, all of which are mounted on a flexible insulating sheet 24 (e.g., a flexible polymeric substrate). Between each of the row conductors, there is an additional thinner conductor 26, 28, 30 and 32. Conductors 26, 28, 30 and 32 are, during operation of the invention, grounded and are employed to isolate the row conductors, one from the other.

While only a short length of conductor sheet is shown in FIG. 4, it is to be realized that an extended length is employed with the invention. This can be understood by referring back to FIG. 1 wherein one end of conductor sheet is affixed at point 34 on shaft 10 and then its length is helically wound around shaft 10 in a clockwise direction until it is terminated at point 36. At point 34, the row conductors on the conductor sheet 12 are brought out to terminals R1, R2, R3 and R4 to there be made available for subsequent connection. At point 36 the ends of conductor 16, 18, 20 and 22 are left in an open circuit condition. Flexible conductor sheet 14 is wound in an identical fashion but with a counter-clockwise helical wind as contrasted to the clockwise wind of conductor sheet 12. The individual conductors on conductor sheet 14 are also brought out to terminals R1', R2', R3', and R4' for subsequent connection.

Cylindrical member 50 is both slidable along and rotatable around shaft 10. It is preferably comprised of a non-conductive plastic material which is both durable and light in weight. Two conductive coupling plates 52 and 54 are emplaced in member 50 and provide capacitive cross-coupling between individual row conductors in conductor sheets 12 and 14. Each of coupling plates 52 and 54 has a width which encompasses three of the row conductors shown in FIG. 4 (see arrow 56). Each of coupling plates 52 and 54 is a parallelopiped with a tilt angle equal to the relative angle between the axis of shaft 10 and the helical wrap of the underlying conductor sheet. As shown in FIG. 3, coupling plate 52 immediately overlays flexible conductor sheet 12 but does not contact the conductors thereof due to the presence of a thin insulative coating 55. While not shown, a similar structure and relationship exists for coupling plate 54 (whose angle of tilt is equal to the wrap angle of conductor sheet 14).

As shown in FIG. 2, the cursor control mechanism is preferably mounted in the frontal portion of a keyboard, preferably on the user's side of the shift bar. The mechanism is thus located where it can be operated by the fingers, thumb or palm of the user's hand. When so operated, the cursor control mechanism permits the fingers of both hands to be substantially free to manipulate the keyboard's keys. If desired, the cursor control mechanism may be configured as a separate entity to be placed directly in front of the keyboard structure.

Figure 5:
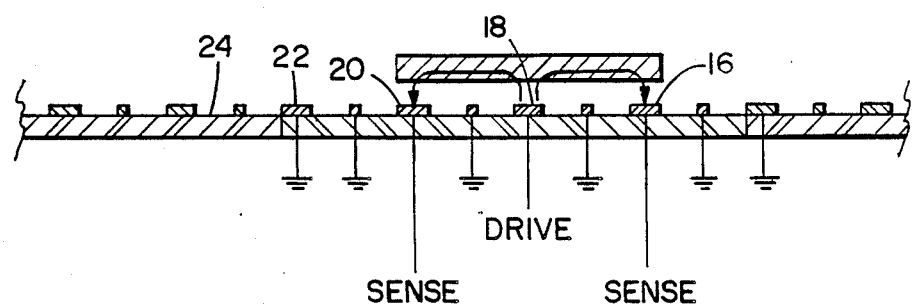
FIG. 5 is a section view taken along line 5—5 in FIG. 1.

Referring now to FIG. 5, a section is shown, taken along line 5—5 in FIG. 1, which illustrates the relationship of coupling plate 52 to the underlying conductor sheet 12. As aforestated, the width of coupling plate 52 encompasses three underlying row conductors (e.g., 16, 18, and 20). As will be hereinafter understood, the operation of the invention requires that an energizing drive pulse be applied to a row conductor (e.g., 18) and that signal be capacitively coupled by plate 52 into adjoining row conductors (e.g. 16 and 20) to be sensed. By sequentially comparing the outputs from the adjoining row conductors, the position of the capacitive coupling plate can be determined. Furthermore, by comparing the relative changes in output of the adjoining row conductors beneath both coupling plates 52 and 54, the direction of movement of cylinder 50 is determined, thus providing the information needed to generate control voltages for a display cursor.

Figure 6:
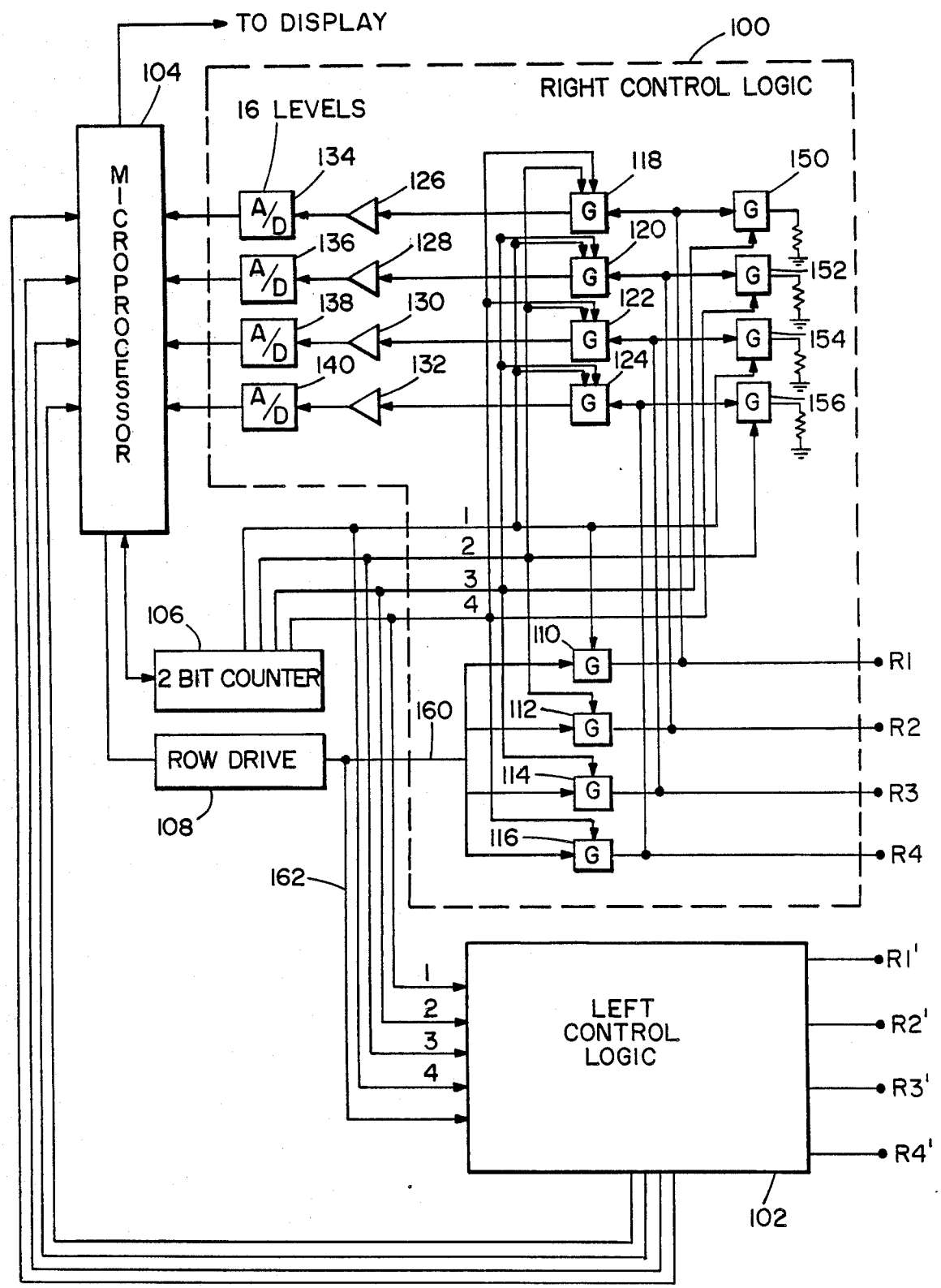
FIG. 6 is a circuit diagram of the electronics associated with the invention.

Control circuitry for the operation of the invention is shown in FIG. 6. The main components of the control circuitry comprise right control logic module 100, left control logic module 102, microprocessor 104, two bit counter 106 and row driver 108. As will hereinafter be understood, the system shown in FIG. 6 essentially accomplishes a multiplexing function whereby the output from row driver 108 is applied to each of rows R1-R4 and R1'-R4' sequentially and in parallel. Simultaneously, the adjoining row conductors on either side of a driven conductor are connected to a sense amplifier and the remaining row conductor is connected to ground.

The detailed operation and structure of right control logic module 100 will be hereafter described. Left control logic 102 is substantially identical except for the fact that it drives and senses signals from conductor sheet 14 rather than conductor sheet 12. Each of rows R1-R4 corresponds to a row conductor on conductor sheet 12. Gates 110, 112, 114, and 116, apply the output of row driver 108 to a selected row conductor. Gates 118, 120, 122, and 124 each have their inputs respectively connected to rows R1, R2, R3, and R4. Their respective outputs are applied to sense amplifiers 126, 128, 130, and 132 whose outputs are in turn fed through analog to digital converters 134, 136, 138, and 140 to microprocessor 104. Each of analog to digital converters 134-140 provides a number of discrete digital levels of analog voltage input. In one preferred embodiment, each analog to digital converter provides sixteen digital output values in accordance with sixteen analog input voltage levels.

Two-bit counter 106 continuously cycles through its four values thereby sequentially providing pulse outputs on each of its output conductors 1-4. It is these conductors which provide the main control for the multiplexing function of this circuit. Gates 150, 152, 154, and 156 are employed to connect the non-utilized row conductor to a source of reference potential.

During each clock cycle of counter 106, row driver 108 provides a pulse signal on lines 160 and 162. Assuming that counter 106 has energized its output line 1, the output from row driver 108 as applied to conductors 160 and 162. The up level on counter output 1 opens gate 110 thereby enabling the row drive pulse to be applied to row R1. Simultaneously in left control logic 102 a row drive pulse is applied onto row R1'. The up level on output line 1 from counter 106 additionally opens gates 120 and 124, thereby enabling signals capacitively coupled to rows R2 and R4 to be passed to sense amplifiers 128 and 132. It should be remembered that row R4 is immediately adjacent to row R1 on shaft 10 as a result of the helical winding pattern of conductor sheet 12.

The sensed outputs are converted to a digital value and are passed to microprocessor 104. Microprocessor 104 strobes its input lines from a/d converters 134-140 to, in essence, take a number of snapshots of their outputs during the time that line 1 of counter 106 is high. Each "snapshot" voltage level is stored. Simultaneously, gate 154 has been opened to ground row conductor R3 to prevent any signals from appearing thereon.

Counter 106 then causes output line 2 to rise and output line 1 to fall. The circuit then repeats the aforementioned action, however, in this instance the output of row driver 108 is applied to row R2 and R2' and sense amplifiers 126 and 130 receive the coupled signals from rows R1 and R3 through gates 118 and 122. A/D converters 134 and 138 again produce digital outputs indicative of the level of induced potentials sensed from rows R1 and R3, which outputs are strobed and stored.

An identical action occurs for the A/D converters in left control logic 102.

Figure 7:
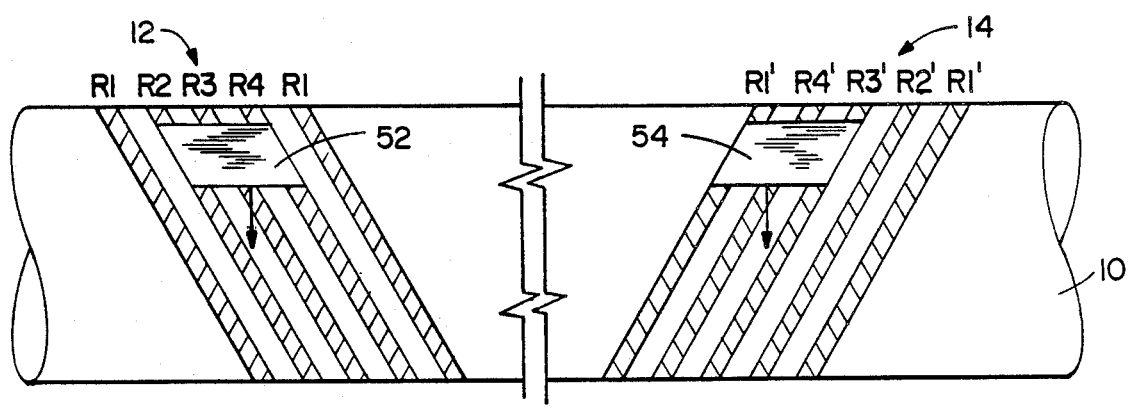
FIGS. 7-9 are schematic showings of various positions of coupling plates over the flexible conductor sheets which enable the system to determine the cylindrical member's direction of movement.
Figure 8:
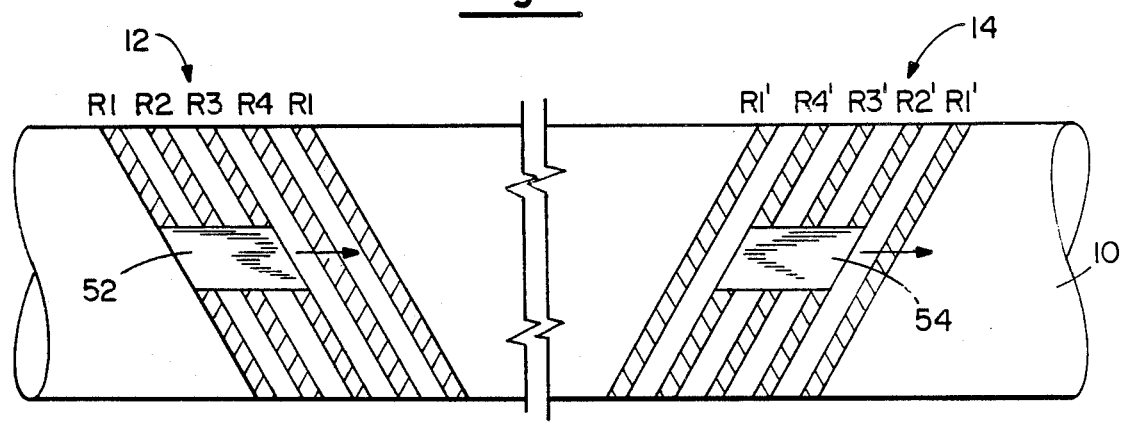
Figure 9:
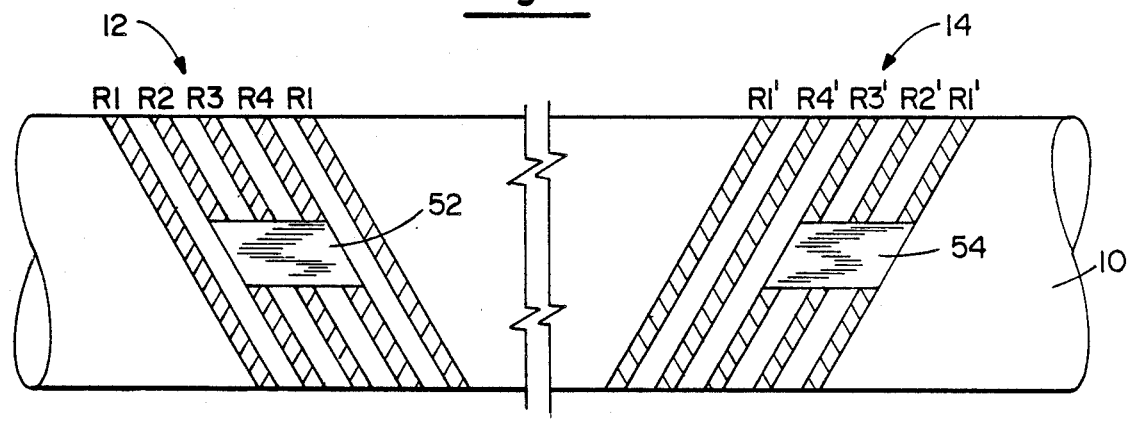

Turning now to FIGS. 7-9, the algorithm employed by microprocessor 104 will be explained which determines, from the snapshots, the directions of movement of cylindrical member 50 in relation to each of conductive sheets 12 and 14. It will be remembered that the inputs to microprocessor 104 are derived from eight A/D converters, each of which provides a plurality of discrete digital output values indicative of analog input values. For exemplary purposes, it will be hereinafter assumed that each A/D converter provides sixteen separate digital outputs which cover the full range of expected analog input values.

Briefly referring back to FIG. 5, if it is assumed that coupling plate 52 moves to the right, the voltage coupled through it from row conductor 18 to row conductor 20 will diminish as coupling plate 52 leaves the vicinity of conductor 20. As this occurs, the current induced in row conductor 20 gradually falls. Similarly, as plate 52 moves to the left and begins to cover row conductor 22, the voltage coupled into conductor 22 will begin to rise. It is those changing output values which are sensed, digitized and provide the necessary indications to determine the direction of movement of plate 52 with respect to the row conductors.

Microcomputer 104 employs the following conventions:

Relative Movement Conventions

Conductor Sheet 12/Plate 52

Plate 52 Moves Left (R4 towards R1)=Negative
Plate 52 Moves Right (R1 towards R4)=Positive Conductor Sheet 14/Plate 54

Plate 54 Moves Left (R1' towards R4')=Negative
Plate 54 Moves Right (R4' towards R1')=Positive To Determine Horizontal Motion Add Snapshot values To Determine Vertical Motion Substract Snapshot values The operation of the above convention will become apparent from the following example. Referring to FIG. 7, coupling plate 52 is shown directly over rows R2, R3 and R4 and coupling plate 54 over rows R1', R4' and R3'. As shown in FIG. 8, coupling plates 52 and 54 have moved vertically downward through rotation of cylindrical member 10 so that plate 52 is now over rows R1, R2 and R3 and plate 54 is over rows R4', R3' and R2'. As a result of the movement of plate 52 away from row R4, the voltage output sensed from row R4 has traversed from a maximum level to a minimum level thereby going through sixteen discrete digital levels. Similarly, since plate 52 moved from not covering row R1 to fully covering row R1, the voltage sensed from row R1 has traversed sixteen voltage levels to a maximum. Thus, the movement of plate 52 has caused a total of thirty-two voltage levels to be trasversed, sensed and accumulated. By the above noted convention, since plate 52 moved to the "left" (e.g. from covering rows R2, R3, R4 to covering rows R1, R2, R3) the sense of the voltage level change is negative or −32.

In a similar fashion, plate 54 has caused the output on R1' to fall by sixteen levels and the output on R2' to rise by sixteen levels. However in this instance, plate 54 has moved to the right and in accordance with the above convention, the resulting value is a +32.

In order to determine the quantum of horizontal motion, the accumulated voltage changes are added (+32 −32=0) and a zero value results indicating no horizontal motion. On the other hand, to determine vertical motion, the accumulated voltage changes are subtracted (−32 −32=−64) giving a net value of −64 indicating a vertical move downward.

Traveling from FIG. 8 to FIG. 9, it is seen that cylindrical member 10 (not shown) moves plates 52 and 54 horizontally to the right. As a result, the output voltage sensed from row R1 falls through sixteen levels and the voltage sensed on row R4 rises by sixteen levels. In accordance with the above convention, this is a positive move with a value of +32. Similarly, the move of coupling plate 54 causes the voltage sensed from row R4' to decrease by sixteen levels and the voltage on row R1' to rise by sixteen levels. In accordance with the convention, this is a positive move with a value of +32. In accordance with the convention, the move values are added and a +64 results indicating a rightward move. When the vertical motion is determined, a zero value results, indicating no vertical movement.

From the above it can be seen that if the coupling plates appear as though they are moving across the rows towards each other, then the rotation is vertically upward. On the other hand, if they appear to be moving away from each other, then the rotation is vertically downward. If both plates are seen to move in the same direction across the rows, the motion is horizontal and may be either in the negative or the positive direction.

Accordingly, through the above technique, microprocessor 104 is able to precisely determine the direction of movements of coupling plates 52 and 54 and, thus, cylindrical member 50. Microprocessor 104 thus provides to the cursor input in a display device, proper input signals to directly mimic the movement of cylindrical member 50. While in the above examples, it has been assumed that plates 52 and 54 are moved by a full row, it should be understood that the traversed voltage levels are continuously accumulated and compared to provide a continuing direction of movement indication. Thus the sums of voltage levels will generally be a small number, depending upon the rapidity of repeated analyses.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

I claim:

1. A hand-controlled mechanism for producing signals to move the position of a cursor in a computer display, the mechanism comprising:
shaft means having an elongated axis;
a plurality of conductor means wrapped about said shaft means;
drive means for applying an energizing signal to a sequence of said conductor means;
cylindrical means mounted on said shaft means and moveable about and along said shaft means in both rotational and translational directions, said cylindrical means provided with conductive plate means which overlap a plurality of said conductor means, said conductive plate means acting to couple an energizing signal applied to a conductor means to other conductor means overlapped by said conductive plate means; and decoder means for sensing said coupled energizing signals and providing an output indicative of the position of said cylindrical means to accordingly control said cursor position.

2. The invention as defined in claim 1, wherein said conductor means are helically wrapped about said shaft means.

3. The invention as defined in claim 2, wherein said conductive plate means spans conductor means adjoining either side of a conductor means to which said energizing signal is applied, and said decoder means is coupled to both said adjoining conductor means, whereby signals coupled into said adjoining conductor means may be analyzed.

4. The invention as defined in claim 3, further comprising:

means for controlling said drive means to apply said energizing signal to each conductor means in sequence, while simultaneously controlling said decoder means to sense said coupled energizing signals into adjoining conductor means.

5. The invention as defined in claim 4, wherein said cylindrical means is hand rotatable about and movable along said shaft means.

6. A hand-controlled mechanism for producing signals to move the position of an indicator in a computer display, the mechanism comprising:

shaft means having an elongated axis;

a first plurality of conductor means wrapped about said shaft means;

a second plurality of conductor means wrapped about said shaft means;

drive means for applying an energizing signal to a sequence of said conductor means in each said first and second plurality of conductor means;

cylindrical means mounted on said shaft means and rotatable about and movable along said shaft means, said cylindrical means provided with first and second conductive plate means, said first conductive plate means overlapping a plurality of said first conductor means, and said second conductive plate means overlapping a plurality of said second conductor means, both said first and second conductive plate means acting to couple, respectively, an energizing signal applied to a conductor means to other overlapped conductor means; and decoder means connectable to said conductor means into which said drive signal is coupled for sensing said coupled energizing signals and providing outputs to accordingly control the position of said indicator.

7. The invention as defined in claim 6, wherein both said first and second plurality of conductor means are helical wrapped about said shaft means, said first plurality of conductor means being wrapped in one orientation, and said second in an opposite orientation.

8. The invention as defined in claim 7, wherein said first plurality of conductor means is wrapped clockwise about said shaft means and said second plurality of conductor means is wrapped counter-clockwise, the angles of said helical wraps being orgthogonal to each other.

9. The invention as defined in claim 8, wherein said drive means simultaneously applies energizing signals to corresponding conductor means in said first and second plurality of conductor means.

10. The invention as defined in claim 9, wherein said conductive plate means spans conductor means adjoining either side of said conductor means to which said energizing signal is applied, and said decoder means is coupled to both said adjoining conductor means whereby signals coupled into said adjoining conductor means may be analyzed.

11. The invention as defined in claim 10, further comprising:

means for controlling said drive means to apply said energizing signal to each conductor means in sequence, while simultaneously controlling said decoder means to sense coupled energizing signals into adjoining conductor means.

12. The invention as defined in claim 11, wherein said cylindrical means is hand moveable around and along said shaft means.

13. The invention as defined in claim 6, said decoder means including means for recording the changes in said signals sensed from said conductor means, and means for combining said changes in said signals to derive the direction of movement of said cylindrical means.

14. The invention as in claim 13, said combining means assigning one sign to recorded voltage changes if said voltages are sensed from successive conductor means arranged one direction along said shaft means and assigning a second sign if said recorded voltage changes are sensed from successive conductor means arranged in a second direction along said shaft means, said combining means combining said changes in said signals algebraically.

* * * * *